(12) United States Patent
Francini et al.

(10) Patent No.: US 12,028,265 B2
(45) Date of Patent: Jul. 2, 2024

(54) SOFTWARE-DEFINED GUARANTEED-LATENCY NETWORKING

(71) Applicant: NOKIA SOLUTIONS AND NETWORKS OY, Espoo (FI)

(72) Inventors: Andrea Francini, Pittsboro, NC (US); Raymond Miller, Lakeville, ME (US); Bruce Cilli, Atlantic Highlands, NJ (US); Charles Payette, Rehoboth Beach, DE (US); Sameerkumar Sharma, Holmdel, NJ (US)

(73) Assignee: NOKIA OF AMERICA CORPORATION, Murray Hill, NJ (US)

( * ) Notice: Subject to any disclaimer, the term of this patent is extended or adjusted under 35 U.S.C. 154(b) by 94 days.

(21) Appl. No.: 17/669,278

(22) Filed: Feb. 10, 2022

(65) Prior Publication Data
US 2023/0254264 A1    Aug. 10, 2023

(51) Int. Cl.
| | |
|---|---|
| H04L 47/56 | (2022.01) |
| H04L 45/76 | (2022.01) |
| H04L 47/22 | (2022.01) |
| H04L 47/6275 | (2022.01) |
| H04L 47/629 | (2022.01) |

(52) U.S. Cl.
CPC ............ H04L 47/56 (2013.01); H04L 45/76 (2022.05); H04L 47/22 (2013.01); H04L 47/6275 (2013.01); H04L 47/629 (2013.01)

(58) Field of Classification Search
CPC ......... H04L 45/76; H04L 47/22; H04L 47/56; H04L 47/629; H04L 47/6275
See application file for complete search history.

(56) References Cited

U.S. PATENT DOCUMENTS

| | | | | |
|---|---|---|---|---|
| 8,693,374 | B1* | 4/2014 | Murphy | H04L 43/10 370/255 |
| 2009/0268739 | A1* | 10/2009 | Dunbar | H04L 45/22 370/392 |
| 2016/0094398 | A1* | 3/2016 | Choudhury | H04L 45/42 370/254 |
| 2016/0248659 | A1* | 8/2016 | Chen | H04L 45/03 |
| 2017/0317953 | A1* | 11/2017 | Sareen | H04L 49/25 |
| 2019/0140976 | A1* | 5/2019 | Liou | H04L 12/4641 |
| 2019/0173784 | A1* | 6/2019 | Guichard | H04L 45/74 |
| 2021/0111991 | A1* | 4/2021 | Vadera | H04L 45/50 |
| 2022/0286395 | A1* | 9/2022 | Gandhi | H04L 45/745 |
| 2023/0098528 | A1* | 3/2023 | Alaettinoglu | H04L 45/123 709/238 |

(Continued)

*Primary Examiner* — Melanie Jagannathan
(74) *Attorney, Agent, or Firm* — Kramer & Amado, P.C.

(57) ABSTRACT

Various embodiments relate to a path computation element (PCE) configured to control a network having ingress edge nodes, interior nodes, and egress edge nodes, including: a network interface configured to communicate with the network; a memory; and a processor coupled to the memory and the network interface, wherein the processor is further configured to: receive a request for a first continuous guaranteed latency (CGL) flow to be carried by the network; make routing and admission control decisions for the requested first CGL flow without provisioning of the first CGL flow and the configuration of schedulers in the interior nodes of the network; and provide flow shaping parameters to a flow shaper at an ingress edge node of the first CGL flow.

9 Claims, 4 Drawing Sheets

(56) References Cited

U.S. PATENT DOCUMENTS

| | | | |
|---|---|---|---|
| 2023/0171178 A1* | 6/2023 | Gamage | H04L 45/24 |
| | | | 370/252 |
| 2023/0262369 A1* | 8/2023 | Zheng | H04Q 11/0003 |
| | | | 398/43 |
| 2024/0064099 A1* | 2/2024 | Pang | H04L 45/54 |

* cited by examiner

SOFTWARE-DEFINED GUARANTEED-LATENCY NETWORKING

Example embodiments disclosed herein relate to systems and methods for achieving a guaranteed latency in a packet network.

BACKGROUND

The new applications enabled by 5G networks for both consumer and vertical markets have brought tight bounds on end-to-end latency to the forefront of requirement specifications for network services. To minimize speed-of-light delays, processing servers for low-latency applications are being moved from core clouds to the edge of the network, as close as possible to their respective clients. But to ensure consistently low latency, queuing delay must also be tightly controlled in every portion of the data path between client and server, including the switching fabric of the data center where the server resides and all transport segments of the 5G network (fronthaul, midhaul, and backhaul, collectively referred to as X-haul).

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a path computation element (PCE) configured to control a network having ingress edge nodes, interior nodes, and egress edge nodes, including: a network interface configured to communicate with the network; a memory; and a processor coupled to the memory and the network interface, wherein the processor is further configured to: receive a request for a first continuous guaranteed latency (CGL) flow to be carried by the network; make routing and admission control decisions for the requested first CGL flow without provisioning of the first CGL flow and the configuration of schedulers in the interior nodes of the network; and provide flow shaping parameters to a flow shaper at an ingress edge node of the first CGL flow.

Various embodiments are described, wherein making routing and admission control decisions is based upon the state of links in the network.

Various embodiments are described, wherein the processor is further configured to: set routing policies for a sporadic guaranteed latency (SGL) flow to be carried by the network.

Various embodiments are described, wherein the processor is further configured to: set the first CGL flow to receive higher service priority than the SGL flow at every node of the network.

Various embodiments are described, wherein the flow shaping parameters include a periodic service sequence that assigns transmission timeslots to packet queues according to their bandwidth allocations and independently of their occupancy state.

Various embodiments are described, wherein the periodic service sequence is computed using a single-layer worst-case-fair weighted fair queuing (WF2Q) scheduler.

Various embodiments are described, wherein the periodic service sequence is computed using a hierarchy of worst-case-fair weighted fair queuing (WF2Q) schedulers.

Various embodiments are described, wherein the processor is further configured to: receive a request for a second CGL flow to be carried by the network; make routing and admission control decisions for the requested second CGL flow; and provide flow shaping parameters to a flow shaper at the ingress edge node to accommodate the first CGL flow and the second CGL flow.

Various embodiments are described, wherein the processor is further configured to periodically receive traffic measurements from the network.

Further various embodiments relate to an ingress edge node that is part of a network having ingress edge nodes, interior nodes, and egress edge nodes, including: a network interface configured to communicate with the network; a memory; and a processor coupled to the memory and the network interface, wherein the processor is further configured to: receive, from the path computation element (PCE), a request to support a first continuous guaranteed latency (CGL) flow to be carried by the network; receive flow shaping parameters from the PCE; and a flow shaper configured to shape the first CGL flow based upon the received flow shaping parameters.

Various embodiments are described, wherein the processor is further configured to: receive, from the PCE, routing policies for a sporadic guaranteed latency (SGL) flow to be carried by the network.

Various embodiments are described, wherein a priority of the first CGL flow is higher than a priority of the SGL flow.

Various embodiments are described, wherein the flow shaping parameters include a periodic service sequence that assigns transmission timeslots to packet queues according to their bandwidth allocations and independently of their occupancy state.

Various embodiments are described, wherein the periodic service sequence is computed using a single layer worst-case-fair weighted fair queuing (WF2Q) scheduler.

Various embodiments are described, wherein the periodic service sequence is computed using a hierarchy of worst-case-fair weighted fair queuing (WF2Q) schedulers.

Various embodiments are described, wherein the processor is further configured to: receive, from the path computation element (PCE), a request to support a second CGL flow to be carried by the network; and receive flow shaping parameters from the PCE for the second CGL flow, wherein the flow shaper is configured to shape the first CGL flow and the second CGL flow based upon the received flow shaping parameters.

Various embodiments are described, wherein the routing policies of the SGL flow are periodically updated based upon periodically updated traffic measurements from the network.

Various embodiments are described, wherein the routing policies of the SGL flow are based upon the state of links in the network.

BRIEF DESCRIPTION OF THE DRAWINGS

Additional objects and features of the invention will be more readily apparent from the following detailed description and appended claims when taken in conjunction with the drawings. Although several example embodiments are illustrated and described, like reference numerals identify like parts in each of the figures, in which:

To facilitate understanding, identical reference numerals have been used to designate elements having substantially the same or similar structure and/or substantially the same or similar function.

DETAILED DESCRIPTION

Figure 1:
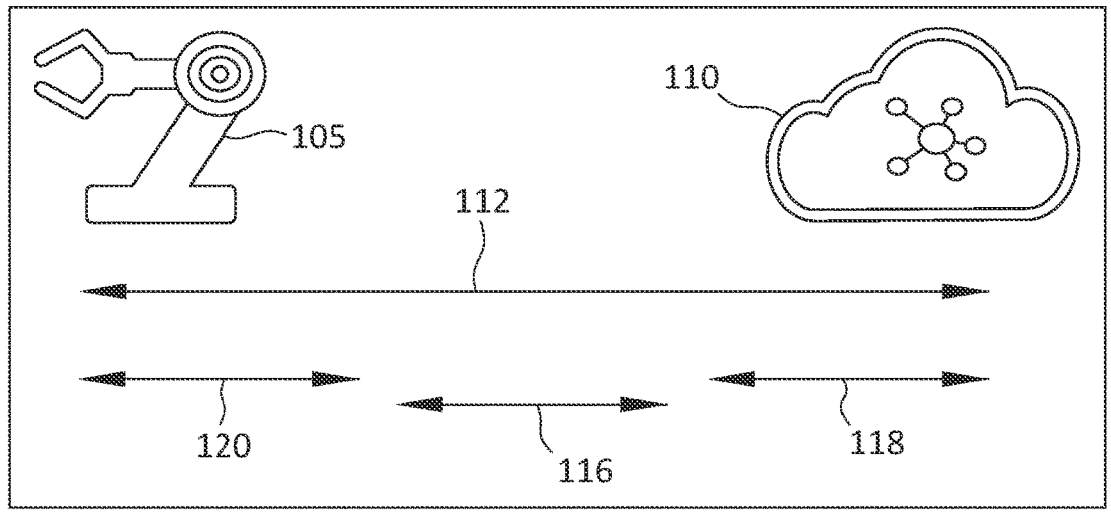
FIG. 1 illustrates a robotic motion control use case that demonstrates the problem addressed by the embodiments described herein.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various example embodiments described herein are not necessarily mutually exclusive, as some example embodiments can be combined with one or more other example embodiments to form new example embodiments. Descriptors such as "first," "second," "third," etc., are not meant to limit the order of elements discussed, are used to distinguish one element from the next, and are generally interchangeable. Values such as maximum or minimum may be predetermined and set to different values based on the application.

Various existing network protocol specifications are available that provide various Quality-of-Service (QOS) frameworks so that data traffic may be transmitted in order to meet various QoS requirements. One such key requirement is latency. The existing network protocols rely upon controlling internal nodes in networks or require hardware-based time-synchronization in order to achieve desired latency and other QoS requirements.

What is desirable is a QoS framework for large-scale networks that enforces tight latency bounds on a per-flow basis. For ease of deployment, the framework should require no active participation from the interior nodes of the network, and therefore no modification of their hardware and software components. Embodiments of systems and methods will be described herein that provide such a QoS framework for large-scale networks that enforces tight latency bounds.

An example use case will be described that provides a scenario defining the QoS challenges found in various systems today. FIG. 1 illustrates a robotic motion control use case that demonstrates the problem addressed by the embodiments described herein. A robot 105 and a cloud application 110 may exchange sensor data (from the robot 105 to the cloud application 110) and motion commands (from the cloud application 110 to the robot 105) with a 2 ms cycle time). The budget on the end-to-end latency 112 for each direction may be 1 ms. The 1 ms latency budget in each direction may be subdivided as follows: the air interface 116 may be allotted 500 μs of the end-to-end latency; the processing of data 120 in the robot may be allotted 250 μs; the remaining 250 μs may be allotted to the combination 118 of the transfer of data packets between the robot 105 and the cloud application 110 and the processing of data by the cloud application.

With the cloud application budget of 250 μs, about 150 μs may be conservatively left for propagation and queuing delay between the cloud server and the air interface. Assuming a 20 km physical distance between the two networking endpoints, 100 μs of this 150 μs is consumed by speed-of-light propagation and only 50 μs is left to the queuing delay budget.

The low-throughput cyclic flow for robotic motion control of FIG. 1 represents just one of the many types of traffic flows that may require end-to-end latency guarantees. The following flow categories can be identified when considering the full range of latency-sensitive industrial and consumer applications.

In one-way periodic control, one-way control messages do not depend strictly on reverse-path feedback. Control messages are time-triggered and continuously generated. One example would be wind turbine monitoring and control.

In one-way aperiodic control, one-way control messages do not depend strictly on reverse-path feedback Control messages are event-triggered and sporadically generated. One example would be massive wireless sensor networks.

In two-way periodic control, one-way control messages depend strictly on reverse-path feedback. Control messages are time-triggered and continuously generated. A reply to one message must be received before the generation time of the next message. One example would be robotic motion control.

In two-way aperiodic control, one-way control messages depend strictly on reverse-path trigger. Control messages are event-triggered and sporadically generated. There is a critical bound on round-trip time (RTT). One example would be high-frequency trading.

In one-way multi-flow cooperative control, each node exchanges control data with many other nodes in close proximity. Messages are both time- and event-triggered. In this situation wireless access is used. One example would be cooperative driving.

For rate-adaptive one-way real-time media such as real-time video, frames must be delivered at a constant pace. A delayed frame is a lost frame. Further, a video encoding rate adapts to data path conditions, and data path conditions are not guaranteed. Often wireless links are included. Also, there may be no admission control. This use case may include interactivity through low-bandwidth control traffic on a reverse path. One example would be game streaming.

For rate-adaptive two-way real-time media including real-time video, video frames must be delivered at constant pace. A delayed frame is a lost frame. Further, a video encoding rate adapts to data path conditions, and data path conditions are not guaranteed. Often wireless links are included. Also, there is no admission control. The video source and receiver may be co-located, and the network provides intermediate processing. A delay constraint applies to the RTT, not just one-way delay. One example would be augmented reality.

For constant-bit-rate one-way real-time media including real-time video, frames must be delivered at constant pace. A delayed frame is a lost frame. A video encoding rate is fixed and does not adapt to data path conditions. The data path conditions are guaranteed. Further, no wireless links are included (unless largely overprovisioned and not mobile). Also, admission control with pre-provisioning of end-to-end path may be used. Complementary lower-bandwidth streams (e.g., audio) may need synchronization. One example would be professional video production.

RAN X-haul may be high-throughput, ultra-low-latency, and not rate-adaptive. In another embodiment, RAN X-haul may be high-throughput, low-latency, and rate-adaptive. In another embodiment, RAN X-haul may be high-throughput, low-latency, and not rate-adaptive. The per-flow throughput is in the kb/s to Gb/s range. The one-way latency may be below 100 μs or in the 1-10 ms range. RAN X-haul traffic may have a constant-bit-rate (CBR) or variable-bit-rate (VBR) profile. Various examples may be 5G CPRI, eCPRI RAN fronthaul, 5G RAN midhaul, and 5G RAN backhaul.

The end-to-end latency for one-way aperiodic control may be 5 ms to 10 ms. For two-way periodic control the RTT latency may be <500 μs to 2 ms for periodic smart factory control and 100 μs to 50 ms for critical smart factory control. For rate adaptive two-way real-time media the RTT may be <50 ms.

The embodiments described here may address the latency requirements described above by classifying the flow categories listed above into a set of traffic classes that a large-scale network can handle without major re-engineering of its hardware and software and also without compromising the QoS requirements of the individual flow categories.

Various solutions have been used and proposed to meet the latency requirements described above for various use cases. These various solutions include the following limitations.

The tightest end-to-end latency guarantees from the prior solutions are those enforced by a network path fully equipped with weighted fair queuing (WFQ) schedulers. Without including the burstiness contribution from the packet source, the end-to-end latency bound is approximately $N_i \cdot L_i/r_i$, where $N_i$ is the number of WFQ schedulers traversed, $L_i$ is the size of the largest packet of flow i, and $r_i$ is the service rate allotted to the flow. In order for the bound to hold, all flows must be explicitly provisioned, and assigned a dedicated queue at all interior nodes, which has long proven to be unfeasible in a large-scale network.

Scheduling of per-class queues is the next approach available. In all existing solutions, the class queues that handle guaranteed-latency (GL) traffic are served with top priority but, in order to avoid starvation of the lower-priority traffic and the formation of traffic bursts within the top-priority class, they must also be shaped (i.e., an upper bound must be imposed on the rate of extraction of packets from them). While the actual implementation of the shaper may vary, shaping of a class queue homogenizes the latency guarantees of all flows handled by the queue, moving them to the upper end of the range of latency requirements of the individual flows in the class.

All existing solutions imply scheduling or shaping contributions from the interior nodes. Besides having to support the required scheduling behavior, the interior nodes must also be kept provisioned with the parameters that control the operation of the scheduler.

Embodiments of a system and associated method will be described that include a framework for the enforcement of end-to-end latency guarantees in large-scale packet networks, i.e., networks where any of the following conditions may not hold: low link rates (not larger than 10 Gb/s); a small number of nodes; a small number of flows with end-to-end latency guarantees; and a short physical distance between network nodes. Examples of large-scale networks for application of the invention include X-haul transport networks for 5G/6G mobile networks and data center networks.

Figure 2:
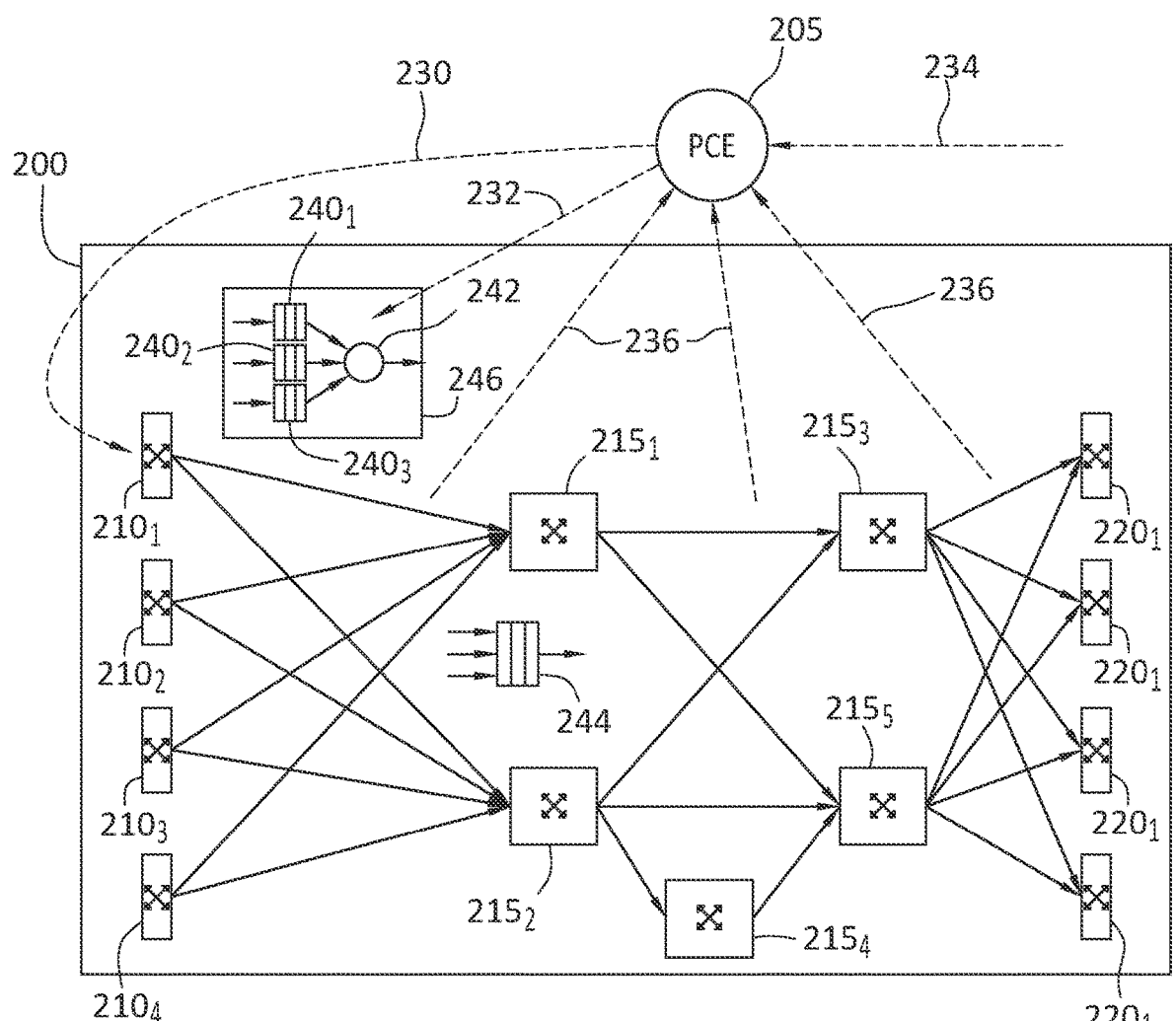
FIG. 2 illustrates a system that may implement a method and framework in order to achieve low latency communication for various classes of data traffic.

FIG. 2 illustrates a system that may implement a method and framework in order to achieve low latency communication for various classes of data traffic. The system includes a path computation element (PCE) 205 that helps to control the flow of data through a network 200. The network may include ingress edge nodes 210, interior nodes 215, and egress edge nodes 220. Each of the ingress edge nodes 210, interior nodes 215, and egress edge nodes 220 may include a plurality of a single first-in-first-out (FIFO) queues, where each queue may be dedicated to a specific class of service. The ingress edge nodes 210 may also include a traffic shaper 246 that receives the highest priority traffic. The traffic shaper 246 would be used for the highest priority traffic rather than a single FIFO queue 244. The traffic shaper 246 may include a plurality of packet queues 240 and an associated scheduler 242. The plurality of packet queues 240 are intended to queue different traffic flows. Then the scheduler 242 will determine which of the packet queues 240 are selected to provide the output of the traffic shaper 246. The shaper may schedule the transmission of packets from each of the packet queues 240 in order to impose an upper bound on the packet transmission rate for these flows. This shaping allows for various types of traffic to be prioritized while at the same time not starving out lower priority traffic that needs to be transmitted. Each of the ingress edge nodes 210 may include a traffic shaper 246. Each of the interior nodes 215 and egress edge nodes 220 include a FIFO queue for different traffic classes that queues received data packets in the associated traffic class for processing. FIG. 2 illustrates one instance of a FIFO queue 244. It is noted that the number of nodes in the network 200 and the number of queues are provided only as an example, and the network 200 may include any number of nodes and queues.

The PCE 205 provides routing and admission control decisions for continuous guaranteed-latency (CGL) flows. A CGL flow has a guaranteed end-to-end latency (or simply "latency") and a known traffic profile. The latency is measured at an egress edge node 220, on CGL packets that traverse an ingress edge link, a number of interior links, and finally an egress edge link to an egress edge node 220. The definitions of edge and interior nodes and links may be taken from IETF RFC 2475, "An architecture for differentiated services". For any given traffic flow, an edge node/link is either an ingress or an egress node/link. The PCE 205 makes routing and admission control decisions on individual CGL flow allocation requests based on the bandwidth currently allocated to CGL flows and possibly also on real-time traffic measurements from the network links. The methods used by the PCE for routing and admission control are beyond the scope of this disclosure, but many existing known methods may be used. Irrespective of the methods used, the PCE never allocates bandwidth to CGL flows beyond a cumulative fraction $\alpha$ of the link capacity C, with $\alpha \leq 1$. The classification of traffic flows will be further discussed below.

The system also implements a network-wide policy that is adjustable per traffic class and controls the routing of other types of packets with tight latency requirements, namely sporadic guaranteed-latency (SGL) packets. The SGL class may include flows of network control traffic, including network protocol messages, node configuration commands, and traffic measurements. The dynamic configuration of the routing policy for each of these classes may be driven by real-time link-load measurements 236 that the PCE 205 gathers periodically from the network links, with the goal of keeping the aggregate load of CGL and SGL traffic always below a fixed fraction $\beta$ of the link capacity, with $\alpha \leq \beta \leq 1$.

Interior nodes 215 and egress edge nodes 220 are not aware of the bandwidth allocations established by the PCE 205. These nodes store packets in per-class FIFO queues that they serve in strict-priority order. Packets of CGL flows are scheduled at the highest priority level. Packets of SGL flows are scheduled at a priority level below the CGL class.

Ingress edge nodes 210 serve packets of different classes in the same priority order used by interior nodes 215. However, within the top-priority class, a per-flow shaper 246 replaces the single FIFO queue 244 of the interior nodes. The shaping rate associated with each flow matches the bandwidth allocated to the flow by the PCE 205. The shaper 246 does not associate the individual flows with respective token buckets, so the shaper 246 does not allow for packet bursts to occasionally exceed the configured shaping rate. The shapers 246 of the ingress nodes may visit the flow queues for service independently of their occupancy state. The set of flow queues may include a free-capacity (FC) queue with allocated service rate equal to the difference between the capacity of the ingress link and the sum of the service rates of the queues that are associated with actual traffic flows. Service visits to the FC queue create opportunities for serving lower-priority queues, just like service visits to flow queues that are currently empty.

The per-flow shapers 246 of the ingress edge nodes 240 may use the shaper implementation specified in U.S. patent application Ser. No. 17/135,845 ('845 application), entitled "Packet Scheduling", filed Dec. 28, 2020, which is hereby incorporated by reference for all purposes as if included herein. The shaper implementation of the '845 application includes a periodic service sequence that assigns transmission timeslots to packet queues according to their bandwidth allocations and independently of their occupancy state. The PCE 205 may receive a new flow allocation request 234. The calculation of an updated service sequence is performed offline after the PCE 205 admits a new flow. The PCE 205 transmits shaper configuration parameters 232 that include updated service sequence to the shaper 246 of the ingress edge node 210 associated with the new flow together with the affirmative admission decision.

If the shaper implementation of the '845 application is deployed in the shaper 246, the PCE 205 may compute the periodic service sequence using a single-layered worst-case-fair weighted fair queuing (WF2Q) scheduler, or a hierarchy of WF2Q schedulers (HWF2Q) that reflects the overall network topology. The PCE 205 may also transmit routing configuration information 230 to the network 200 that includes various routing information for the various network nodes.

The system for managing traffic is built on the observation that a much easier and economically feasible approach to enforcing tight bounds on end-to-end latency is offered by the combination of larger link capacities (10 Gb/s and above) with a source-based traffic shaping function that prevents the formation of large packet queues at the interior nodes of the network. Accordingly, the system uniquely applies per-flow shaping at the ingress edge nodes 210 and plain strict-priority scheduling of per-class queues at the interior nodes 215.

The definition and prioritization of traffic classes are essential to the system in order to enforce tight bounds on the end-to-end latency. All categories of latency-sensitive traffic listed above may be subdivided into two traffic classes: a continuous guaranteed-latency (CGL) class and a sporadic guaranteed-latency (SGL) class. A CGL flow has an extended lifetime and a relatively regular pattern of traffic generation that may be upper-bounded by a shaping rate. These two properties make it possible to provision the flow before its data source starts generating traffic. The provisioning includes the allocation of bandwidth resources along a network route that has sufficient resources to accommodate the provisioned flow. This provisioning may be carried out by the PCE 205. However, the bandwidth allocation triggers configuration actions only at the ingress edge nodes 210, whereas for the interior nodes 215 the configuration actions only include bandwidth accounting updates that are confined within the PCE 205 that routes and admits the CGL flows. This means that no changes are needed to the interior nodes 215 to accommodate the CGL flows.

An SGL flow lacks either the certainty about the extended lifetime or the existence of a regular pattern of traffic generation. Accordingly, admission control and bandwidth allocation make no sense for an SGL flow. Because per-flow provisioning is not feasible for SGL traffic, routing of these flows must be based on a network-wide policy (e.g., the same type of policy that populates the routing tables of the network nodes for non-latency-sensitive traffic, but possibly fine-tuned by latency considerations).

In a representative embodiment of the system, the following traffic categories from the list provided above are natural candidates for inclusion in the CGL traffic class: one-way periodic control, two-way periodic control, constant-bit-rate one-way real-time media, and RAN X-haul, high-throughput, non-rate-adaptive traffic, requiring low and ultra-low latency. In the same example embodiment, all other traffic categories with low and ultra-low latency requirements may be mapped onto the SGL class. However, the mapping of traffic categories (and therefore applications and services) onto the CGL and SGL traffic classes is generally left to the service provider and respective customers and are driven by various service provider and customer requirements.

GL traffic flows (i.e., both CGL and SGL flows) share the network with other types of traffic, most notably best-effort (BE) traffic, carrying data for conventional applications that do not have tight latency requirements. BE traffic may be scheduled with lower priority than SGL (and CGL) traffic. With the traffic shaping described further below, the presence of CGL traffic is perceived by the lower-priority classes, including SGL, as a mere subtraction of link bandwidth with firm admission-controlled boundaries and extreme time regularity for the availability of the remaining bandwidth. As an example, a 10 Gb/s link with 2 Gb/s bandwidth allocated to top-priority CGL flows is perceived by SGL flows as a link with 8 Gb/s capacity always available at a packet timescale, adding between 0 and 2 Gb/s whenever a fraction of the provisioned CGL traffic is not present.

The system applies the same per-class scheduling priorities at the ingress edge nodes 210 and interior nodes 215 of the network. The only difference is within the CGL class: at the ingress edge nodes 210 per-flow shaping is applied and in the interior nodes 215 a work-conserving per-class FIFO queue is used.

The ingress traffic shaper 246 may operate as a worst-case-fair weighted-fair queuing (WF2Q) scheduler to minimize the burstiness in the distribution of service to individual queues. WF2Q schedulers are known to minimize the service burstiness within the broader class of GPS-related schedulers because they minimize the metric, called worst-case fairness index, that quantifies the maximum time that the scheduler allows between consecutive services granted to the same busy queue. The system achieves the defining non-work-conserving behavior of the per-flow shaper by adopting the system clock as the virtual time of the WF2Q scheduler. Other types of schedulers may also be used based upon the specific application.

Further, the system introduces the following two elements in the configuration and operation of the non-work-conserving WF2Q scheduler that provide benefits in decreasing end-to-end latency.

First, the scheduler grants service to all queues independently of their current state of occupancy (as opposed to a conventional scheduler, which only considers for service queues that hold queued packets at the time of the selection). When the scheduler grants service to a queue that is currently empty, the WF2Q scheduler of the system assumes that a packet of a pre-defined size is transmitted out of the queue and searches for the next flow queue to serve only after a time interval corresponding to the transmission time of that virtual packet. In the meantime, the scheduler transmits one or more packets, if available, out of the lower-priority class queues.

Second, the set of queues served by the scheduler includes a free-capacity (FC) queue whose configured service rate is the difference between the link capacity and the sum of the service rates allocated to all flow queues. The FC queue is visited by the scheduler like every other queue. The regularity of the WF2Q visits ensures that the services of the FC queue are passed to the lower-priority classes (SGL and BE) with the same regularity, therefore inducing on the flows of those classes the perception that the ingress link operates at a capacity that always matches or exceeds the service rate of the FC queue.

In a network where all ingress edge nodes 210 apply the per-flow WF2Q shaper 246, all ingress links exhibit high regularity in the consumption of bandwidth by CGL packets. Still, because the system makes no effort to synchronize the schedulers of the ingress edge nodes 210, bursts of CGL packets may form at any interior node of the network, when multiple CGL packets destined for the same output interface of the node arrive simultaneously from multiple input interfaces. The worst-case size of such bursts at a link M may be estimated to depend linearly on the total number $N_M^{CGL}$ of CGL flows that traverse the same interior link, independently of their bandwidth allocations. This is because the WF2Q shaper in front of the ingress boundary link controls the burstiness of the services given to individual flows but not that of services given to the flows within the link that are still conjoined at a downstream interior link.

Consideration of $N_M^{CGL}$ as the key metric defining the possible accumulation of packet bursts, and therefore queuing delay, in the interior links of the network provides a clear indication for an effective solution: the probability and size of CGL packet bursts at interior links can be mitigated by minimizing $N_M^{CGL}$. This should not mean that the amount of CGL flows in the network should be limited. Instead, the existing CGL flows should be handled in such a way that they are perceived by the interior links as if they were in a smaller number. This can be achieved by aggregation of the flows in the ingress schedulers, not by mapping multiple flows onto a single queue, because inter-flow service fairness cannot be ensured within a single FIFO queue without explicit regulation of the incoming packets, but by establishing within the per-flow shaper 246 a scheduling hierarchy that reflects the network topology and the way the local CGL flows are routed through it. Using this hierarchical approach in the configuration of the WF2Q shaper, every ingress link contributes only one (macro) flow to the burstiness of the interior link, instead of every individual flow that it sends to that link. With only one macro-flow per ingress link, the maximum burst size at the interior links depends no longer on the total number of CGL flows but on the total number of ingress links, which is much smaller and is also derived directly from the network topology, irrespective of the actual distribution of CGL traffic.

Figure 3:
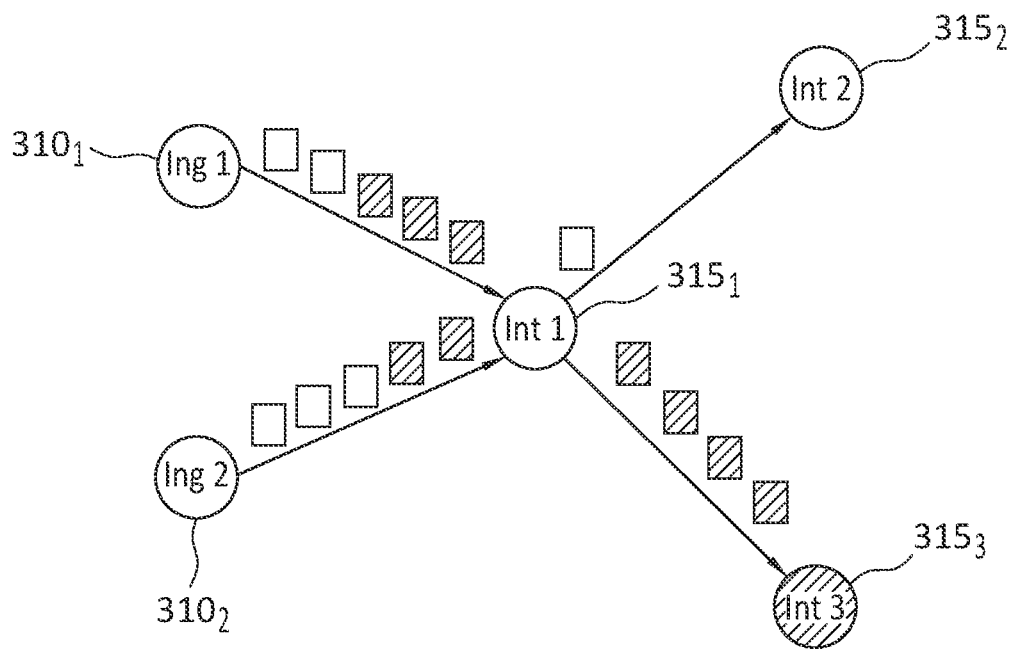
FIG. 3 illustrates that the Flat WF2Q shaper does not prevent the formation of large packet bursts at an interior node of the network.
Figure 4:
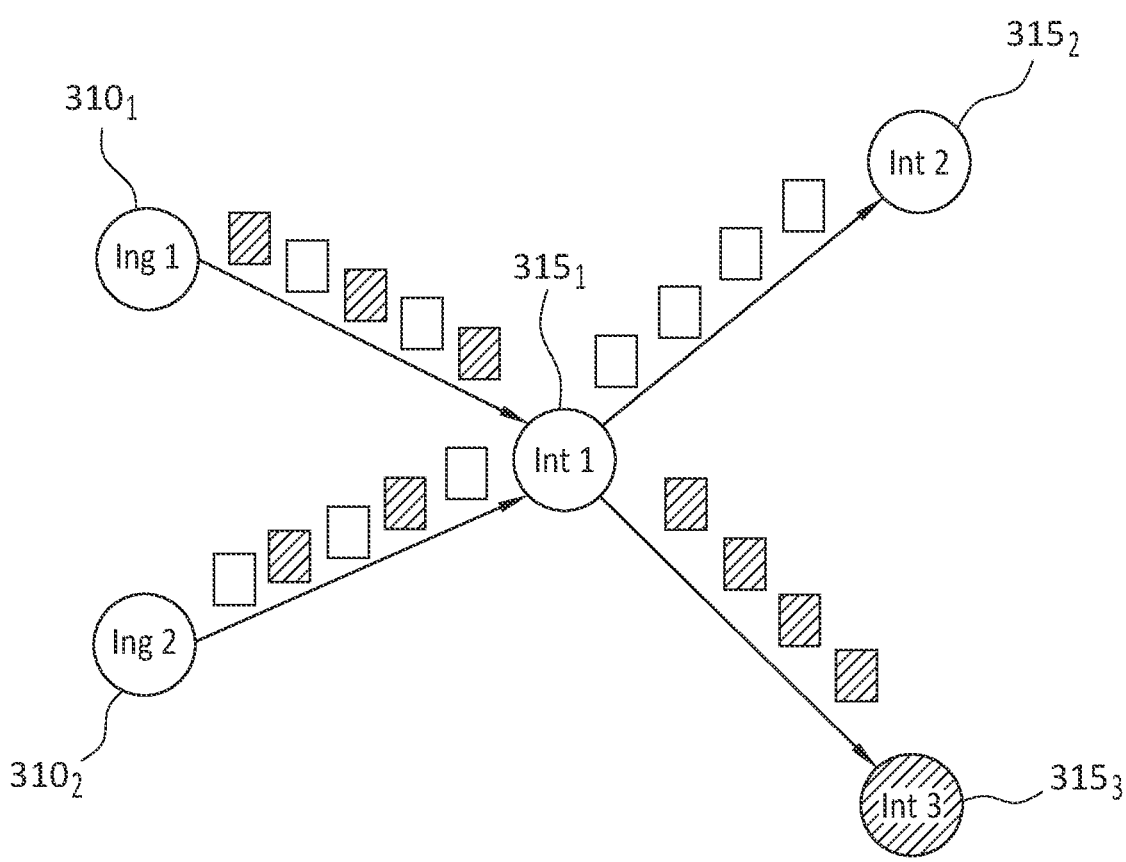
FIG. 4 illustrates that a hierarchical WF2Q shaper can prevent the formation of large packet bursts at an interior node of the network.

FIGS. 3 and 4 illustrate the benefit of a topology-driven scheduling hierarchy in the ingress shapers. FIG. 3 illustrates that a Flat WF2Q shaper does not prevent the formation of large packet bursts at an interior node of the network. However, the shaper does not control the relative placement of services given to flows that share downstream links. In the example service pattern of FIG. 3, the schedulers of both ingress edge node 310$_1$ and ingress node 310 provide back-to-back services to flows that share the same link out of interior node 315$_1$. The negative consequence shown in this case is that the link to internal node 315$_2$ remains idle for a while, at a time when it could have transmitted packets if it only had received them from the ingress schedulers 310$_1$ and 310$_2$. The missed service opportunities translate into higher end-to-end latency for the packets going to internal node 315$_2$. FIG. 4 illustrates that a hierarchical WF2Q shaper can prevent the formation of large packet bursts at an interior node of the network. FIG. 4 also illustrates the benefits of a hierarchical shaper that is instead aware of the links to internal node 315$_2$ and internal node 315$_3$ and ensures that both traffic aggregates are never starved over the respective links.

In a hierarchical scheduler built out of WF2Q nodes, the time complexity of the scheduling decision grows linearly with the depth of the hierarchy. Due to the eligibility condition of the WF2Q building block, the entire hierarchy must be traversed for every scheduling decision. In a high-speed network interface, it may become impossible to complete the full traversal within the minimum time available between scheduling decisions (typically resulting from the time needed to transmit the smallest packet that the network can handle). The scheduling decision may actually be problematic to complete during that time even with a single WF2Q node. In one embodiment of the system, the flow shapers 246 of the ingress links are implemented as described in the '845 application.

One common method for reducing the time complexity of the scheduling decision in practical implementations of hierarchical flow schedulers for high-speed network interfaces extends the time between scheduling decisions by transmitting more than one packet out of the same queue when visiting it for service. The method is definitely helpful in single-node WF2Q schedulers but does not eliminate the limitation on the depth of the scheduling hierarchy.

Another method relies on the pipelining of the scheduling decision: every scheduling time is used for traversing in parallel different portions of the hierarchy, based on decisions made during the previous scheduling interval. This method allows for deeper hierarchies but introduces an additional lag between packet arrivals and departures, which increases the end-to-end latency.

A solution for simplifying the scheduling decision in a shaping hierarchy, which makes the decision effectively insensitive to the depth of the hierarchy, is based on the guaranteed-bandwidth scheduler (GBS) disclosed in the '845 application. The GBS operation is driven by a periodic service sequence (PSS) that is computed offline under the assumption of continuous occupation of all queues, including the FC queue. The PSS includes scheduling timeslots that are assigned to individual queues. When the link is available for a new packet transmission, the GBS visits the timeslot corresponding to the current time. If the timeslot is assigned to a queue that is currently not empty, the head packet of the queue is transmitted. Otherwise the scheduler searches the lower-priority class queues and serves the first one that the scheduler finds not empty. Because the scheduling sequence is computed offline, the scheduling sequence may be obtained from a scheduling hierarchy with virtually unlimited depth (the largest depth required in a practical application is defined by the largest number of hops that a flow handled by the scheduler may need to traverse before reaching its egress node).

The QoS framework defined by the system relies on the PCE for making routing and admission decisions on incoming CGL flows and for configuring the per-flow shapers of the ingress nodes. The admission control function may be devised to allow for a portion of the link capacity to remain available to lower-priority traffic classes (including SGL and BE) at all times. When the ingress boundary scheduler instantiates the GBS of the '845 application, the PCE may also be responsible for calculation and distribution of the PSS to the schedulers of the ingress links. The details of the routing and flow admission methods executed by the PCE for the provisioning of CGL flows are beyond the scope of this disclosure.

SGL flows are not admission-controlled and are not individually routed. Instead, their routing is based on network-wide policies that may be customized per traffic class (but not per flow). An illustrative example of a routing method for SGL flows may be defined in the context of a leaf-spine data-center network, where the switching fabric consists of a Clos network and the ingress links are those that connect the data center servers to the respective leaf switch ports. Equal-Cost Multi-Path (ECMP) routing is the most common policy for routing application flows not only in a leaf-spine fabric, but also in any other fabric topology that connects its edge nodes with multiple equal-cost paths.

Figure 5:
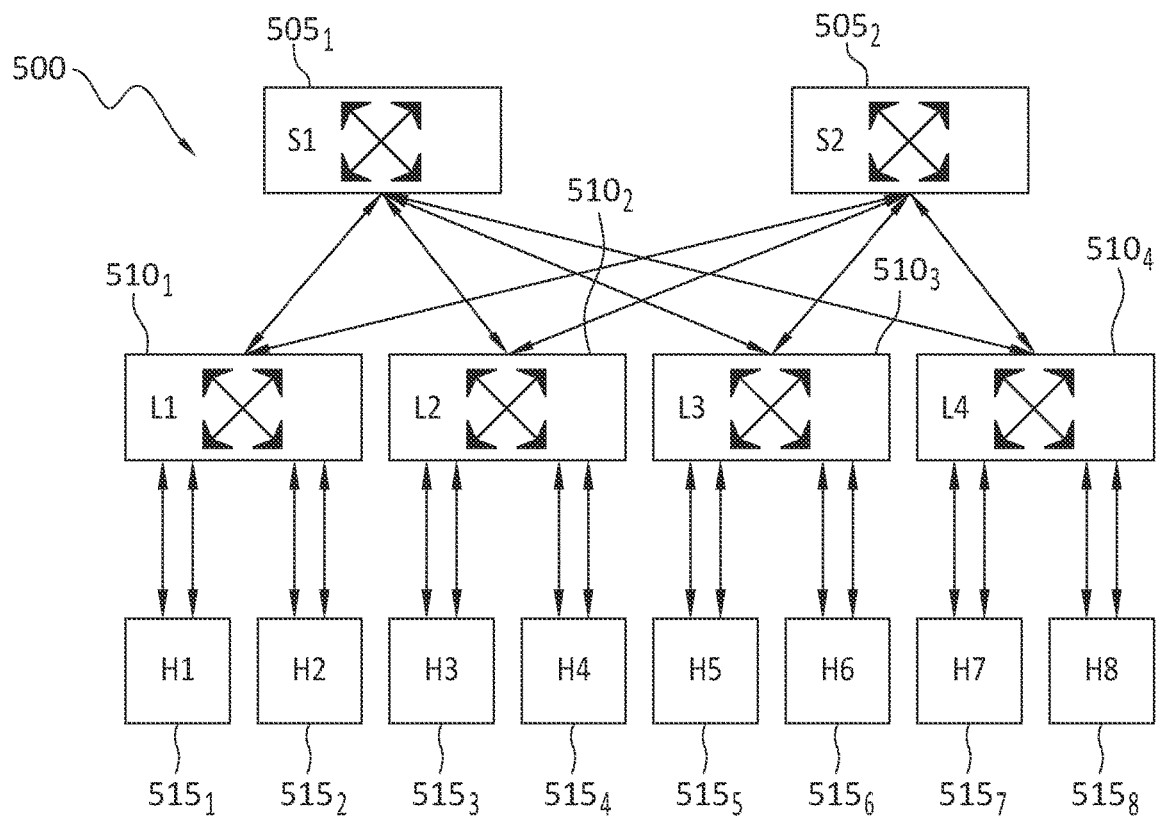
FIG. 5 illustrates a leaf-spine topology for a data center network fabric.

FIG. 5 illustrates a leaf-spine topology for a data center network fabric. The network 500 includes spine switches $505_1$ and $505_2$. The network 500 further includes a plurality of leaf switches $510_1$-$510_4$. Finally, the network 500 includes a plurality of hosts $515_1$-$515_8$. The spine switches 505 are interconnected with each of the leaf switches 510. Each of the hosts 515 are connected to one leaf switch 510. This architecture allows for any host to be connected to any other host in the network. This hierarchical network architecture has benefits that will be used to implement the traffic flows through the network 500.

At the ingress leaves of the leaf-spine fabric, multiple equal-cost paths are available to every packet for reaching the egress leaf switch that takes it to its destination. Every path corresponds to one of the spine switches 505 of the fabric. The selection of the spine may be done by hashing selected fields in the header of the packet, such that packets of the same flow are always routed through the same path. A weighted version of the policy (WCMP) may be used for re-balancing traffic within the fabric when hotspot links are created by the base policy. A modification of the WCMP weights for the SGL class may be invoked whenever the aggregate of CGL and SGL traffic approaches the saturation of one or more fabric links. Accurate monitoring of the link load levels is required for prompting the re-balancing of traffic before the link load starts having a negative impact on the end-to-end latency of SGL flows. The details of the load-monitoring and WCMP dynamic reconfiguration schemes are beyond the scope of this disclosure.

Figure 6:
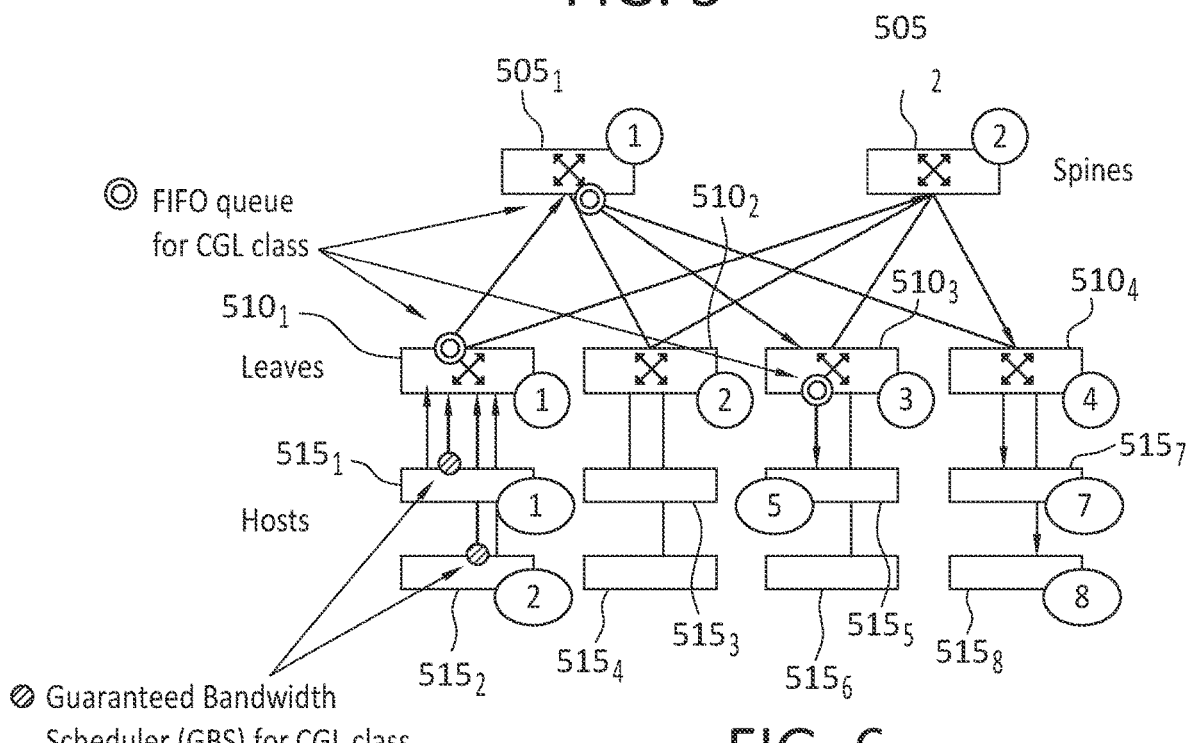
FIG. 6 illustrates an example network operation for demonstrating the benefits of applying hierarchical shapers in the ingress nodes of the leaf-spine data center fabric of FIG. 5.

FIG. 6 illustrates an example network operation for demonstrating the benefits of applying hierarchical shapers in the ingress nodes of the leaf-spine data center fabric of FIG. 5. Hosts $505_1$ and $505_2$ originate CGL flows that are destined for hosts $515_5$, $515_7$, and $515_8$.

The bandwidth allocations of the traffic flows of FIG. 6 are shown in the tables below. The allocations are expressed as fractions of the link capacity. The nominal CGL load on the link between leaf $510_3$ and host $515_5$ is 100%. The same is true for the links between host $515_1$ and leaf $510_1$ and between host $515_2$ and leaf $515_1$.

| GBS configuration at host $515_1$ | | | | |
|---|---|---|---|---|
| Queue ID | Destination Host | Destination Leaf | Leaf Link | Guaranteed Bandwidth |
| 1.1 | 5 | 3 | 1 | 0.10 [x1] |
| 1.2-1.11 | 5 | 3 | 1 | 0.10 [x10] |
| 1.12-1.91 | 7 | 4 | 2 | 0.10 [x80] |

| GBS configuration at host $515_2$ | | | | |
|---|---|---|---|---|
| Queue ID | Destination Host | Destination Leaf | Leaf Link | Guaranteed Bandwidth |
| 2.1-2.80 | 5 | 3 | 1 | 0.10 [x80] |
| 2.81-2.100 | 8 | 4 | 2 | 0.10 [x20] |

The example evaluates the delay experienced by the flow of queue 1.1 under different methods for calculation of the periodic service sequence of the GBS of the '845 application. All of the packets that come out of queue 1.1 may traverse various scheduling stages in sequence. In the traffic scenario of the example, queuing delay contributions come exclusively from the per-flow shapers of hosts $515_1$ and $515_2$ and from the FIFO queue of the CGL class in leaf $510_1$. The queues of spine $505_1$ and leaf $510_3$ do not add delay because they do not receive packets from sources other than leaf $510_1$.

The evaluation of the delay experienced by packets of the flow of queue 1.1 in simulation experiments with a Flat WF2Q shaper and with a hierarchy of WF2Q shapers shows that the delay accumulated by such packets in the FIFO queue of leaf $510_1$ ranges from 3 to 20 packet transmission times with Flat WF2Q shaper and is always equal to 3 packet transmission times with a hierarchy of WF2Q shapers. Similar experiments confirm that with Flat WF2Q shaper the queuing delay in the queues of the interior nodes depends on the number of CGL flows that use the queues, whereas with a hierarchy of WF2Q shapers the delay only depends on the number of ingress nodes that send CGL flows through the nodes of the queues.

Figure 7:
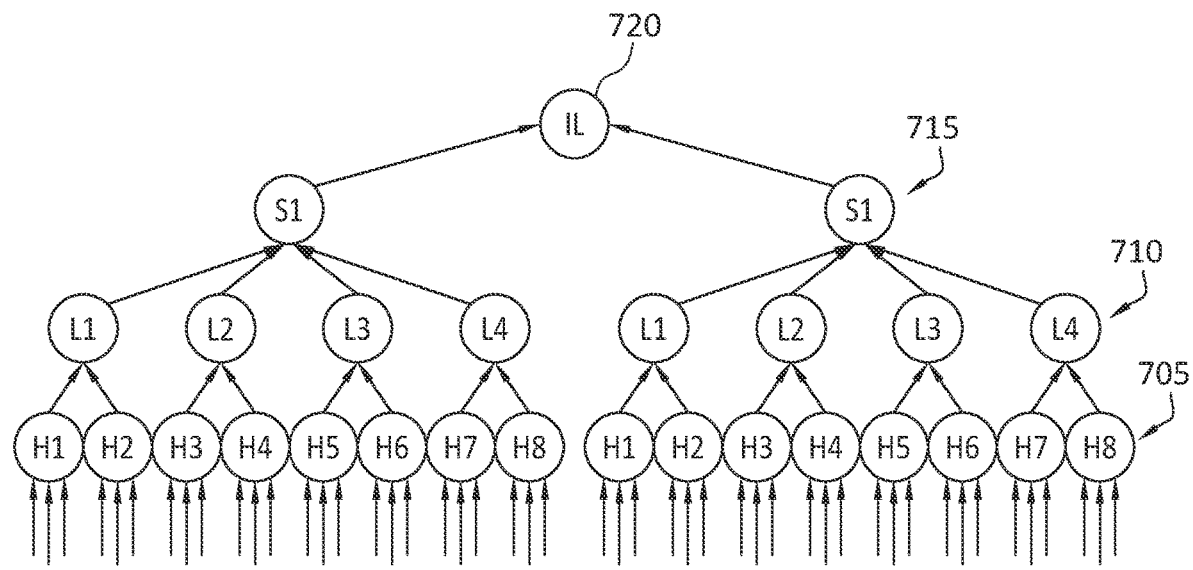
FIG. 7 illustrates a shaping hierarchy at a host network interface card.

FIG. 7 illustrates a shaping hierarchy at a host network interface card (NIC). In FIG. 7 the HWF2Q hierarchy is fully populated and corresponds to the network topology found in FIG. 5, with one scheduling layer per queuing stage in the network. The first layer 705 includes one shaping node for every destination host in the network. Every shaping node serves the packet queues of the flows that are destined for the respective egress host, but only those that reach the egress host through the data path formed by the network nodes associated with the shaper nodes in the upper layer of the same branch of the hierarchy tree. The second scheduling layer 710 includes one shaper node per egress leaf node. Every node serves the shaping nodes associated with the egress hosts that are connected to the egress leaf node. The third scheduling layer 715 includes one shaper node per spine node. Every node in this layer serves the shaping nodes corresponding to all the egress leaf nodes of the network. Finally, shaping node 720 at the top of the hierarchy corresponds to the egress link of the ingress node. The shaping node 720 serves the shaping nodes corresponding to the spine nodes of the network topology of FIG. 5.

The mapping between scheduling layers and the switching stages of the network topology can be defined in multiple ways. The specification of the optimal criterion for the mapping, assuming that one exists, is beyond the scope of this disclosure, but various known techniques may be used. For example, the first layer 705 could be chosen alternatively to map onto the spine nodes of the network, the second layer 710 could map onto the egress hosts, and the third layer 715 could map onto the egress leaf nodes.

The service sequence for each queue may be computed offline by the PCE at the time of flow creation. The CGL scheduling hierarchy will have a depth D and a width W that may be arbitrarily large. Because the service sequence is computed offline at the time of flow creation, with flow creation occurring at much lower frequency than the transmission of packets, sufficient processing resources may be brought to bear in performing the needed schedule processing. The schedule includes timeslots of fixed duration, where the timeslot is larger than the transmission time of the largest packet (e.g., the time needed for transmission of 1600 bytes). Then one queue is served per timeslot according to the specified schedule.

In an alternative embodiment, a single layer WF2Q scheduling hierarchy may be used. While this approach is simpler to implement, various analysis has shown that the hierarchical scheduler provides better performance.

The networks system embodiments described herein include various benefits based upon various features of the embodiments including the following. A new criterion for grouping the traffic flows of a network into traffic classes based on their latency requirements, on their expected lifespan, and on the existence of a known traffic profile has been defined. Examples include the CGL and SGL classes described above. The system also implements a diversification of the method or policy used for routing traffic flows based on the respective traffic classes. A new criterion for prioritizing traffic flows in a work-conserving strict-priority scheduler, where the absolute highest priority is given to flows that are individually shaped upon entering the network at the ingress edge nodes 240.

The system implements a method for enforcing end-to-end latency guarantees in a large-scale network that does not require the provisioning of queue parameters in the interior nodes of the network. Also, a method is included that enforces end-to-end latency guarantees in a large-scale network that relies on per-flow shaping at the ingress edge nodes 210 of the network. A flow shaper 246 performs a method of configuring the per-flow shaper with a virtual queue whose shaping rate is the portion of the link capacity that is not allocated to actual traffic flows. The per-flow shaper 246 operates assuming that every queue served by the shaper is never empty. Also, a method for enforcing tighter end-to-end latency guarantees in a large-scale network that relies on a hierarchy of shaping nodes, where the hierarchy is derived from the network topology. The flow shaper also implements a method for running a hierarchical shaper with a large hierarchy depth where the time complexity of the scheduling decision is independent of the depth of the hierarchy.

Figure 8:
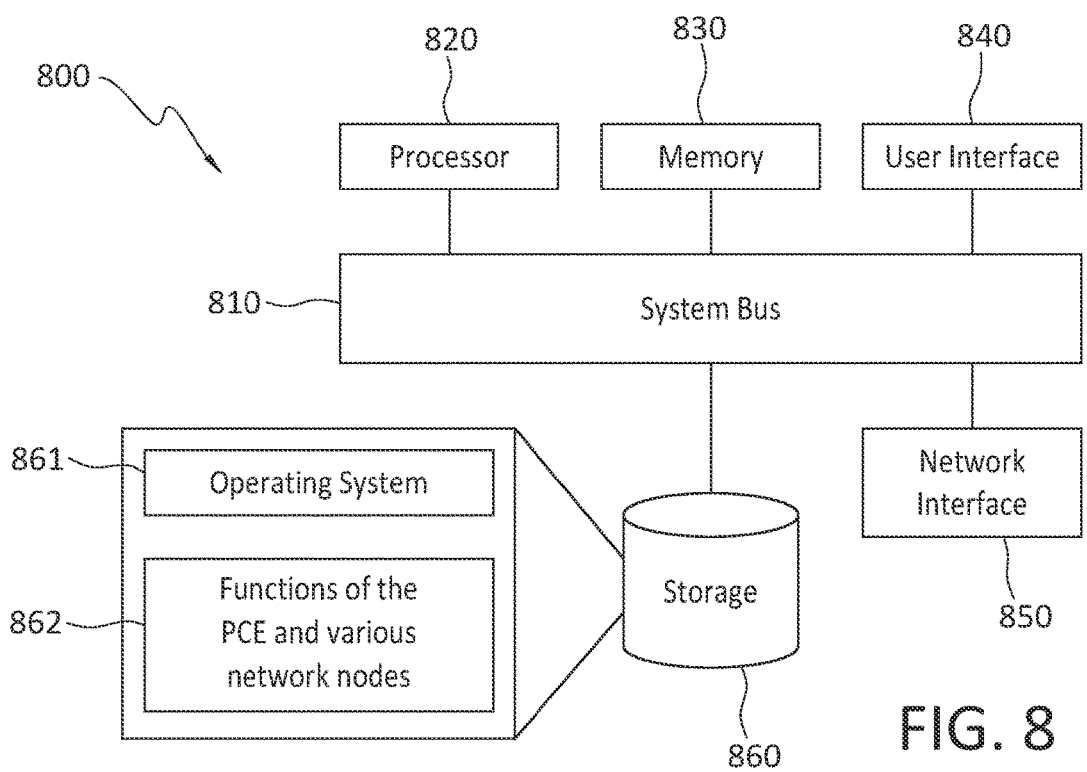
FIG. 8 illustrates an exemplary hardware diagram for implementing the PCE, ingress edge node, internal node, or egress edge node.

FIG. 8 illustrates an exemplary hardware diagram 800 for implementing the PCE, ingress edge node, internal node, or egress edge node of FIG. 2. As shown, the device 800 includes a processor 820, memory 830, user interface 840, network interface 850, and storage 860 interconnected via one or more system buses 810. It will be understood that FIG. 8 constitutes, in some respects, an abstraction and that the actual organization of the components of the device 800 may be more complex than illustrated.

The processor 820 may be any hardware device capable of executing instructions stored in memory 830 or storage 860 or otherwise processing data. As such, the processor may include a microprocessor, microcontroller, graphics processing unit (GPU), neural network processor, field programmable gate array (FPGA), application-specific integrated circuit (ASIC), or other similar devices.

The memory 830 may include various memories such as, for example L1, L2, or L3 cache or system memory. As such, the memory 830 may include static random-access memory (SRAM), dynamic RAM (DRAM), flash memory, read only memory (ROM), or other similar memory devices.

The user interface 840 may include one or more devices for enabling communication with a user such as an administrator. For example, the user interface 840 may include a display, a touch interface, a mouse, and/or a keyboard for receiving user commands. In some embodiments, the user interface 840 may include a command line interface or graphical user interface that may be presented to a remote terminal via the network interface 850.

The network interface 850 may include one or more devices for enabling communication with other hardware devices. For example, the network interface 850 may include a network interface card (NIC) configured to communicate according to the Ethernet protocol or other communications protocols, including wireless protocols. Additionally, the network interface 850 may implement a TCP/IP stack for communication according to the TCP/IP protocols. Various alternative or additional hardware or configurations for the network interface 850 will be apparent.

The storage 860 may include one or more machine-readable storage media such as read-only memory (ROM), random-access memory (RAM), magnetic disk storage media, optical storage media, flash-memory devices, or similar storage media. In various embodiments, the storage 860 may store instructions for execution by the processor 820 or data upon with the processor 820 may operate. For example, the storage 860 may store a base operating system 861 for controlling various basic operations of the hardware 800. Further, the storage may include instructions 862 for carrying out the functions of the PCE, ingress edge node, internal node, or egress edge node as described above.

It will be apparent that various information described as stored in the storage 860 may be additionally or alternatively stored in the memory 830. In this respect, the memory 830 may also be considered to constitute a "storage device" and the storage 860 may be considered a "memory." Various other arrangements will be apparent. Further, the memory 830 and storage 860 may both be considered to be "non-transitory machine-readable media." As used herein, the term "non-transitory" will be understood to exclude transitory signals but to include all forms of storage, including both volatile and non-volatile memories.

The system bus 810 allows communication between the processor 820, memory 830, user interface 840, storage 860, and network interface 850.

While the host device 800 is shown as including one of each described component, the various components may be duplicated in various embodiments. For example, the processor 820 may include multiple microprocessors that are configured to independently execute the methods described herein or are configured to perform steps or subroutines of the methods described herein such that the multiple processors cooperate to achieve the functionality described herein. Further, where the device 800 is implemented in a cloud computing system, the various hardware components may belong to separate physical systems. For example, the processor 820 may include a first processor in a first server and a second processor in a second server.

In accordance with one or more of the aforementioned embodiments, the methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the operations of the system and method embodiments described herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Although the various exemplary embodiments have been described in detail with particular reference to certain exemplary aspects thereof, it should be understood that the invention is capable of other example embodiments and its details are capable of modifications in various obvious respects. As is apparent to those skilled in the art, variations and modifications can be affected while remaining within the spirit and scope of the invention. The embodiments may be combined to form additional embodiments. Accordingly, the foregoing disclosure, description, and figures are for illustrative purposes only and do not in any way limit the invention, which is defined by the claims. The embodiments may be combined to form additional embodiments.

We claim:

1. A path computation element (PCE) configured to control a network having ingress edge nodes, interior nodes, and egress edge nodes, comprising:
   a network interface configured to communicate with the network;
   a memory; and
   a processor coupled to the memory and the network interface and configured to group traffic flows into continuous guaranteed latency flows and sporadic guaranteed latency flows based on latency requirements, expected lifespan, and existence of a known traffic profile, wherein the processor is further configured to:
   receive a request for a first continuous guaranteed latency (CGL) flow to be carried by the network, the CGL flow having an extended lifetime and a regular pattern of traffic generation that is upper-bounded by a shaping rate;
   make routing and admission control decisions for the requested first CGL flow without provisioning of the first CGL flow and without configuration of schedulers in the interior nodes of the network; and
   provide flow shaping parameters to a flow shaper at an ingress edge node of the first CGL flow.

2. The PCE of claim 1, wherein making routing and admission control decisions is based upon the state of links in the network.

3. The PCE of claim 1, wherein the processor is further configured to:
   set routing policies for a sporadic guaranteed latency (SGL) flow to be carried by the network.

4. The PCE of claim 3, wherein the processor is further configured to:
   set the first CGL flow to receive higher service priority than the SGL flow at every node of the network.

5. A path computation element (PCE) configured to control a network having ingress edge nodes, interior nodes, and egress edge nodes, comprising:
   a network interface configured to communicate with the network;
   a memory; and
   a processor coupled to the memory and the network interface and configured to group wherein the processor is further configured to:
   receive a request for a first continuous guaranteed latency (CGL) flow to be carried by the network;
   make routing and admission control decisions for the requested first CGL flow without provisioning of the first CGL flow and without configuration of schedulers in the interior nodes of the network; and
   provide flow shaping parameters to a flow shaper at an ingress edge node of the first CGL flow, wherein the flow shaping parameters include a periodic service sequence that assigns transmission timeslots to packet queues according to their bandwidth allocations and independently of their occupancy state.

6. The PCE of claim 5, wherein the periodic service sequence is computed using a single-layer worst-case-fair weighted fair queuing (WF2Q) scheduler.

7. The PCE of claim 5, wherein the periodic service sequence is computed using a hierarchy of worst-case-fair weighted fair queuing (WF2Q) schedulers.

8. The PCE of claim 1, wherein the processor is further configured to:
   receive a request for a second CGL flow to be carried by the network;
   make routing and admission control decisions for the requested second CGL flow; and
   provide flow shaping parameters to a flow shaper at the ingress edge node to accommodate the first CGL flow and the second CGL flow.

9. The PCE of claim 1, wherein the processor is further configured to periodically receive traffic measurements from the network.

\* \* \* \* \*